(12) United States Patent
Condaminet et al.

(10) Patent No.: US 9,989,015 B2
(45) Date of Patent: Jun. 5, 2018

(54) LAUNCHER STAGE COMPRISING A TEMPORARY SUPPORT STRUCTURE FOR TEMPORARILY SUPPORTING NOZZLE SECTIONS ALLOWING ACCESS TO THE CORE OF THE ENGINE

(71) Applicant: SNECMA, Paris (FR)

(72) Inventors: Olivier Condaminet, Gasny (FR); Guy Lecompte, Bonniers sur Seine (FR); Philippe Matura, Saint Vincent des Bois (FR)

(73) Assignee: SNECMA, Paris (FR)

( * ) Notice: Subject to any disclaimer, the term of this patent is extended or adjusted under 35 U.S.C. 154(b) by 921 days.

(21) Appl. No.: 14/385,888

(22) PCT Filed: Apr. 12, 2013

(86) PCT No.: PCT/FR2013/050796
§ 371 (c)(1),
(2) Date: Sep. 17, 2014

(87) PCT Pub. No.: WO2013/153340
PCT Pub. Date: Oct. 17, 2013

(65) Prior Publication Data
US 2015/0047362 A1    Feb. 19, 2015

(30) Foreign Application Priority Data

Apr. 13, 2012  (FR) ...................................... 12 53431

(51) Int. Cl.
*F02K 9/96*    (2006.01)
*F02K 9/97*    (2006.01)
(Continued)

(52) U.S. Cl.
CPC .............. *F02K 9/976* (2013.01); *B64G 1/401* (2013.01); *F01D 25/285* (2013.01); *B64G 1/002* (2013.01);
(Continued)

(58) Field of Classification Search
CPC . F02K 9/96; F02K 9/976; F02K 99/00; F01D 25/285; F05D 2230/68;
(Continued)

(56) References Cited

U.S. PATENT DOCUMENTS

| | | | | |
|---|---|---|---|---|
| 3,183,664 A | * | 5/1965 | Divone | F02K 9/976 239/265.33 |
| 3,270,504 A | * | 9/1966 | Ward | F02K 9/976 239/265.33 |

(Continued)

FOREIGN PATENT DOCUMENTS

| | | |
|---|---|---|
| FR | 2 622 931 | 5/1989 |
| WO | 2010 112766 | 10/2010 |

OTHER PUBLICATIONS

Installation of the F-1 Engine to the Saturn V S-IC Stage for Testing, NASA/Marshall Space Flight Center, Mar. 1, 1965.*

(Continued)

*Primary Examiner* — Lorne Meade
(74) *Attorney, Agent, or Firm* — Oblon, McClelland, Maier & Neustadt, L.L.P.

(57) ABSTRACT

A stage of a space launcher including an engine core, a tank secured above the engine core, and a nozzle including a first deployable nozzle section secured below the engine core, the nozzle further including a second and a third section configured to be situated extending from each other when the nozzle is in a deployed propulsion configuration. The stage further includes a structure for temporarily supporting nozzle sections mounted on the tank, configured to change (Continued)

the nozzle to a configuration for accessing the engine core wherein the nozzle sections are inserted into each other, with the third section bearing against a lower support of the temporary structure.

10 Claims, 6 Drawing Sheets

(51) Int. Cl.
   *F01D 25/28* (2006.01)
   *B64G 1/40* (2006.01)
   *B64G 1/00* (2006.01)
(52) U.S. Cl.
   CPC ...... *F05D 2230/68* (2013.01); *F05D 2260/96* (2013.01); *Y10T 29/49229* (2015.01)
(58) Field of Classification Search
   CPC ........... B64G 1/002; B64G 1/401; B64F 5/10; E04G 1/36; E04G 1/362
   See application file for complete search history.

(56) References Cited

U.S. PATENT DOCUMENTS

| | | | | |
|---|---|---|---|---|
| 4,213,566 A * | 7/1980 | Miltenberger | ........... | F02K 9/976 239/265.43 |
| 4,313,567 A * | 2/1982 | Feight | ..................... | F02K 9/976 239/265.33 |
| 4,383,407 A * | 5/1983 | Inman | ..................... | F02K 9/976 239/265.33 |
| 4,387,564 A * | 6/1983 | Carey | ..................... | F02K 9/976 239/265.33 |
| 4,489,889 A * | 12/1984 | Inman | ..................... | F02K 9/976 239/265.33 |
| 4,727,959 A * | 3/1988 | Kummer | ................... | E04G 1/36 182/115 |
| 4,932,607 A * | 6/1990 | Layton | ..................... | B64G 5/00 244/63 |
| 5,294,078 A * | 3/1994 | Gurr | ......................... | B64G 5/00 244/116 |
| 5,850,989 A * | 12/1998 | Trudeau | ................... | B64F 1/04 244/115 |
| 5,927,653 A * | 7/1999 | Mueller | ................... | B64G 1/14 244/138 R |
| 6,418,710 B1 * | 7/2002 | Perrier | ..................... | F02K 9/976 60/771 |
| 8,893,503 B2 * | 11/2014 | Condaminet | ........... | F02K 9/976 239/265.11 |
| 9,080,533 B2 * | 7/2015 | Fiolek | ..................... | F02K 9/976 |
| 9,169,807 B2 * | 10/2015 | Dobek | ..................... | F02K 9/976 |
| 2012/0067052 A1 | 3/2012 | Condaminet et al. | | |

OTHER PUBLICATIONS

F-1 Rocket Engine G4049 Engine Vertical Installer, pp. 1-16 [accessed on Aug. 31, 2017 at http://heroicrelics.org/info/f-1/f-1-vei-g4049.html].*

French Search Report dated Jan. 14, 2013 in Application No. 1253431 Filed Apr. 13, 2012.

International Search Report dated Jun. 4, 2013 in PCT/FR13/050796 Filed Apr. 12, 2013.

* cited by examiner

LAUNCHER STAGE COMPRISING A TEMPORARY SUPPORT STRUCTURE FOR TEMPORARILY SUPPORTING NOZZLE SECTIONS ALLOWING ACCESS TO THE CORE OF THE ENGINE

FIELD OF THE INVENTION

The present invention relates to the field of space launchers.

More specifically, the invention relates to a space launcher comprising a main stage connected to an upper stage wherein the ejection nozzle is deployable.

STATE OF THE RELATED ART

On a launcher such as Ariane 5, a plurality of propulsion systems are provided. This firstly consists of two lateral powder propulsion units, used for the take-off stage, and which produce almost 90% of the thrust. After these powder propulsion units are detached to lighten the launcher, the engine of the main stage of the launcher takes over to leave the Earth's atmosphere. After the reserves thereof have been exhausted, the main stage separates from the upper stage, the engine whereof continues to provide propulsion, until the payload has been placed in orbit.

The upper stage generally comprises a tank below which an engine core is attached, in turn extended downwards by an ejection nozzle. This nozzle, also referred to as "divergent", creates thrust by ejecting water vapour at high speed, produced by the combustion of liquid hydrogen and oxygen.

The nozzle is thus the element of the upper stage that accelerates gases and the combustion chamber outlet. In a vacuum, the longer the divergent nozzle, the greater the thrust produced by the ejected gases. For this reason, a nozzle which is as long as possible is envisaged. Nevertheless, the longer the nozzle, the greater the size thereof. This is conveyed by an increase in the overall mass of the launcher, which goes against the usual principle aiming at lightening same, so as to be able to increase the mass of the payload transported.

To solve this problem, a deployable nozzle has been proposed, provided with three nozzle sections suitable for moving relative to each other along the axial direction of the nozzle. In this way, these sections are capable of being moved from a so-called "redeployed" launch configuration, wherein the two bottommost sections are raised, to a deployed propulsion configuration wherein said sections are situated in line with each other, to form a nozzle of maximum length.

Consequently, on the launch pad, prior to launching, the upper stage of the launcher is assembled on the main stage with the nozzle thereof in the launch configuration, wherein the sections thereof are partially retracted. While this makes it possible to reduce the length of the upper stage, and thus reduce the overall mass of this stage and that of the entire launcher, holding some of the sections in the upper position results in prohibited/complex access to the engine core surrounded by said sections.

However, after the installation of the upper stage on the main stage, some operations need to be carried out on the main core of the upper stage engine, prior to launching.

These consist, for example, of nominal operations, such as for example final inspections, but they may also consist of non-nominal operations, such as the replacement of defective components.

In any case, each operation requires work on the nozzle sections initially held in the upper position, so as to move same firstly to the lower position to reveal the engine core whereon the operators need to work, and then to reassemble these sections so as to return the nozzle to the launch configuration thereof.

The handling of these nozzle sections gives rise to a considerable increase in the complexity of the launcher use cycle prior to the launch thereof, and results in risks of damage of these sections, particularly if they are made of composite material.

SUMMARY OF THE INVENTION

The aim of the invention is thus that of at least partially remedying the drawbacks mentioned above, relative to the embodiments of the prior art.

For this purpose, the invention relates to a space launcher stage comprising, in the upright position, an engine core, a tank secured above the engine core and a first deployable nozzle section secured below the engine core, said deployable nozzle also comprising a second section borne by a structure enabling the deployment thereof, along with a third section, said first, second and third nozzle sections being intended to be situated extending from each other when the nozzle is in the deployed propulsion configuration, with the second section being situated extending from the first section, and the third section being situated extending from the second section bearing same.

According to the invention, said stage further comprises a structure for temporarily supporting nozzle sections mounted on said tank, suitable for changing the nozzle to a configuration for accessing the engine core wherein the first section at least partially enters the second section, and wherein the second section at least partially enters the third section wherein the lower end bears against a lower support of said temporary support structure.

The invention is remarkable in that the addition of the temporary support structure, comparable to a cradle, offers a simple and satisfactory solution for changing and holding the nozzle in a configuration enabling access to the engine core, to be able to perform the required work prior to launching, on the launch pad. This work may thus be performed in a very reliable manner.

This configuration enabling access to the engine core may even be adopted at the stage production output, and during the transport of the stage to the launch pad. Under these conditions, after assembling the various stages on the launch pad, the operators working on the engine core have no preliminary operation to carry out on the nozzle sections to be able to access said core.

Furthermore, the invention provides the nozzle with high mechanical strength in the configuration thereof enabling access to the engine core, particularly by means of the third section thereof bearing on the lower support of the temporary support structure. This advantage is particularly beneficial during the phase for transporting the launcher to the launch pad thereof, since this reduces the risks of nozzle section damage considerably.

Finally, the temporary support structure may serve as an access bridge for operators to perform work on the engine core. They may thus use the structure to walk thereon and/or to secure themselves thereto, reducing the risks of accidents.

Preferably, in said configuration for accessing the engine core, the lower end of said second nozzle section also bears against said lower support of the temporary support structure, even though this could be otherwise, without leaving the scope of the invention. The advantage of such a specific feature lies in the increase in the mechanical strength of the nozzle, due to the two sections bearing on the lower support of the temporary support structure. Alternatively, therefore, the second nozzle section may not bear on this support, but merely carried by the abovementioned structure, enabling the deployment thereof.

Preferably, in said configuration for accessing the engine core, the upper end of each of the second and third nozzle sections is situated on a level with or below the upper end of the first section connected to the engine core. This results in very high accessibility of the engine core to perform the required work therein.

Preferably, said temporary support structure comprises rods connecting the lower support to the tank. By means of these rods, the overall mass of the temperature support structure may remain low, and have a reasonable size. The space between these rods may be readily adapted to enable easy access for the operators required to work on the engine core. Furthermore, the rods may be used by the operators to secure themselves, manually and/or using a safety harness.

Preferably, said lower support adopts the shape of a ring, preferably designed such that operators can walk thereon.

Preferably, said temporary support structure also comprises an upper support situated above the upper end of each of the second and third nozzle sections in the configuration for accessing the engine core. Here again, this upper support is preferably designed such that operators can walk thereon, while they work on the engine core.

It is also makes it possible to limit the movement of the second and third sections in the upward vertical direction, which is beneficial for transport during which the nozzle sections are preferentially held axially and/or radially by the temporary support structure.

Finally, the upper support makes it possible to limit shocks on the sections situated below same, such as for example shocks from a falling tool.

Preferably, said temporary support structure also comprises a connection frame between the upper and lower supports, this frame being arranged around the third section.

This frame helps protect the sections, particularly against shocks. It may also be used, like the lower and upper supports, to hold the sections during the transport phase.

Finally, said temporary support structure preferentially also comprises at least one element from access steps and a tool storage compartment.

The invention also relates to a space launcher comprising at least one stage as described above, this stage then preferentially forming an upper stage intended to be assembled on a main launcher stage.

The invention finally relates to a method for manufacturing a space launcher comprising a main stage and an upper stage as described above, said method comprising the following steps:
  producing the upper stage, by changing the nozzle to the configuration for accessing the engine core;
  transporting said upper stage to a launch pad, with the nozzle in the configuration for accessing the engine core; and
  on the launch pad, mounting the upper stage onto the main stage, with the nozzle in the configuration for accessing the engine core.

Under these conditions, after assembling the various stages on the launch pad, the operators working on the engine core have no preliminary operation to carry out on the nozzle sections to be able to have access to the engine core, and carry out the work required therein. Obviously, preferentially, the configuration for accessing the engine core is retained throughout the phase during which the work is required/possible.

Preferably, the following steps, prior to the launch, are then carried out:
  placing the nozzle in a launch configuration wherein the second section is arranged around the engine core, and bears at the lower end thereof said third section; and
  removing the temporary support structure.

Further advantages and features of the invention will emerge in the non-limiting detailed description hereinafter.

BRIEF DESCRIPTION OF THE DRAWINGS

This description will be made with reference to the appended figures wherein.

DETAILED DESCRIPTION OF PARTICULAR EMBODIMENTS

Figure 1:
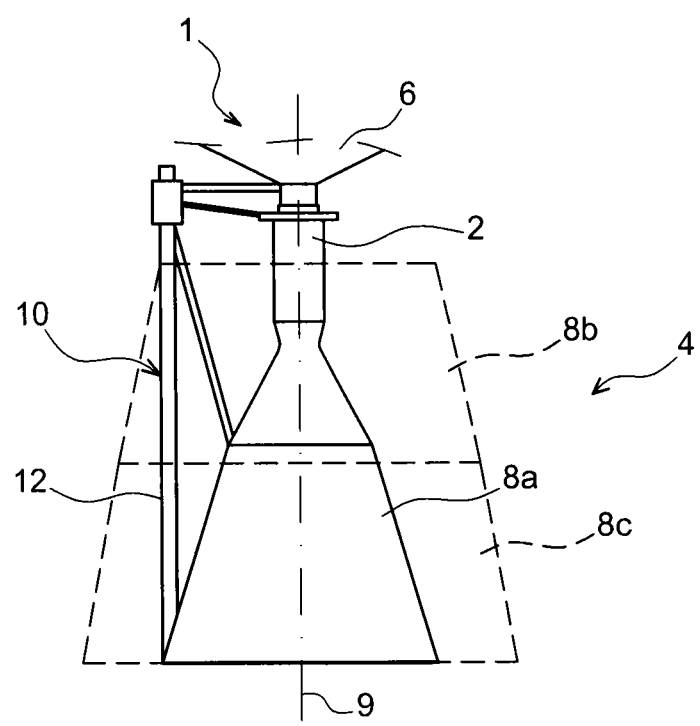
FIG. 1 represents a schematic front view of a part of a launcher stage according to one preferred embodiment of the present invention, with the nozzle thereof in the launch configuration.
Figure 1A:
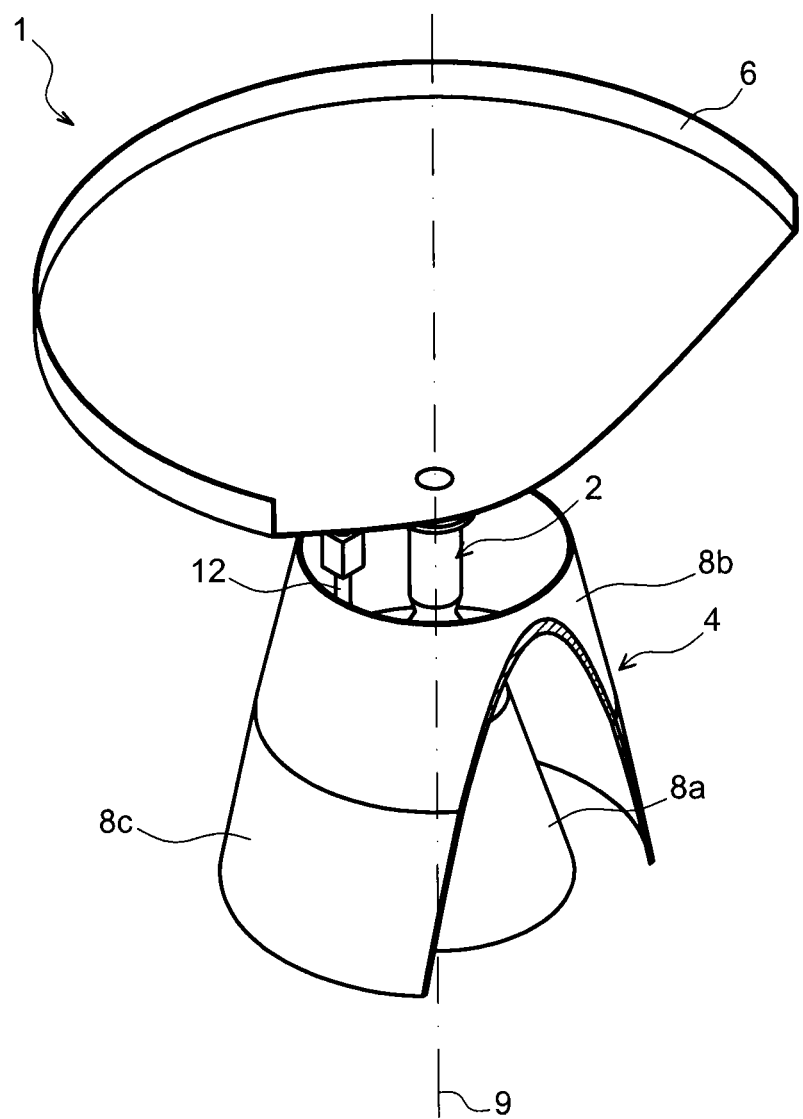
FIG. 1a represents a perspective view of the part of the launcher stage shown in the previous figure.
Figure 2:
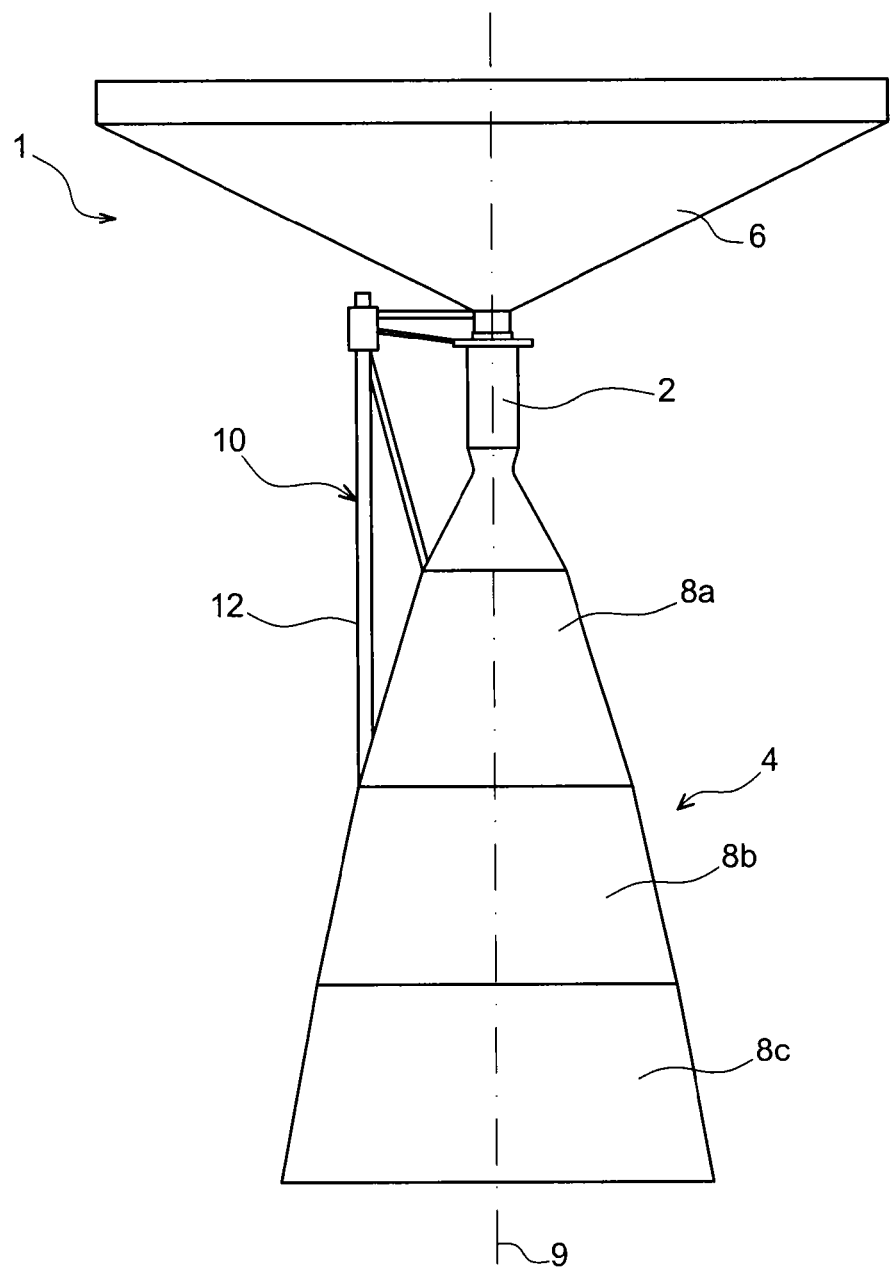
FIG. 2 represents a similar view to that in FIG. 1, with the nozzle in the deployed propulsion configuration.

With reference to FIGS. 1, 1a and 2, a part of an upper stage of a space launcher according to one preferred embodiment of the present invention is represented, the launcher being of the Ariane 5 type.

The launcher stage 1, represented in the upright position, comprises an engine core 2 including in particular a combustion chamber wherein the reaction between liquid hydrogen and oxygen takes place, producing water vapour which is ejected at a high speed by the nozzle 4 situated below the engine core 2.

The hydrogen and oxygen are contained in a tank 6 arranged above the engine core 2, the mechanical junction between these two elements being provided using a conical tank base, as shown in FIGS. 1, 1a and 2. The payload intended to be transported by the launcher is borne above the tank 6, on this upper launcher stage.

To reduce the mass and size, the nozzle 4 has a deployable feature. It consists of three sections 8a, 8b, 8c, suitable for moving relative to each other along the axial direction 9 of this nozzle, corresponding to the vertical direction. Each of these sections adopts a generally tapered shape, so as to form a divergent nozzle together.

In FIGS. 1 and 1a, the nozzle is represented in the launch configuration, whereas in FIG. 2, the nozzle is in the deployed propulsion configuration. These two configurations, which will be detailed hereinafter, are respectively adopted on the launch pad prior to launching, and during the mission after separating the upper stage and the main stage of the launcher.

In the launch configuration shown in FIGS. 1 and 1a, the first nozzle section 8a is secured to the lower end of the engine core 2. This attachment is furthermore retained regardless of the configuration adopted by the nozzle. The first section 8a is thus projected downwards from the engine core 2.

On the other hand, the second section 8b and the third section 8c adopt a raised position suitable for reducing the axial length of the nozzle 4. More specifically, the second section 8b is raised such that the lower end thereof is situated approximately at the level of the upper end of the first section 8a. It is borne by a structure 10 enabling the axial movement thereof. This structure 10, known to those skilled in the art, is secured to the first section 8a and to the tank 6 and/or to the engine core 2, by means of girders supporting a vertical rack 12 along which the second section 8b is slidably controlled electrically.

The third section 8c is also held in the raised position, while being borne by the second section 8b. More specifically, these two sections are situated extending from each other, by adopting a relative position identical to that in the deployed propulsion configuration. A reversible mechanical connection known to those skilled in the art is provided between the upper end of the third section 8c and the lower end of the second section 8b, for example of the lock mechanism type.

In this launch configuration adopted on the launch pad, the lower end of the third section 8c is situated approximately at the lower end of the first section 8a.

While raised, the second section 8b encompasses a large part of the engine core 2. On the other hand, in the deployed propulsion configuration shown in FIG. 2, the sections 8b and 8c are lowered so as to be situated in line with the lower end of the first section 8a, so as to form a tapered nozzle, also referred to as divergent nozzle, of maximum length. This lowering is performed electrically using the rack 12, also with the third section 8c locked onto the second section 8b.

Figure 3:
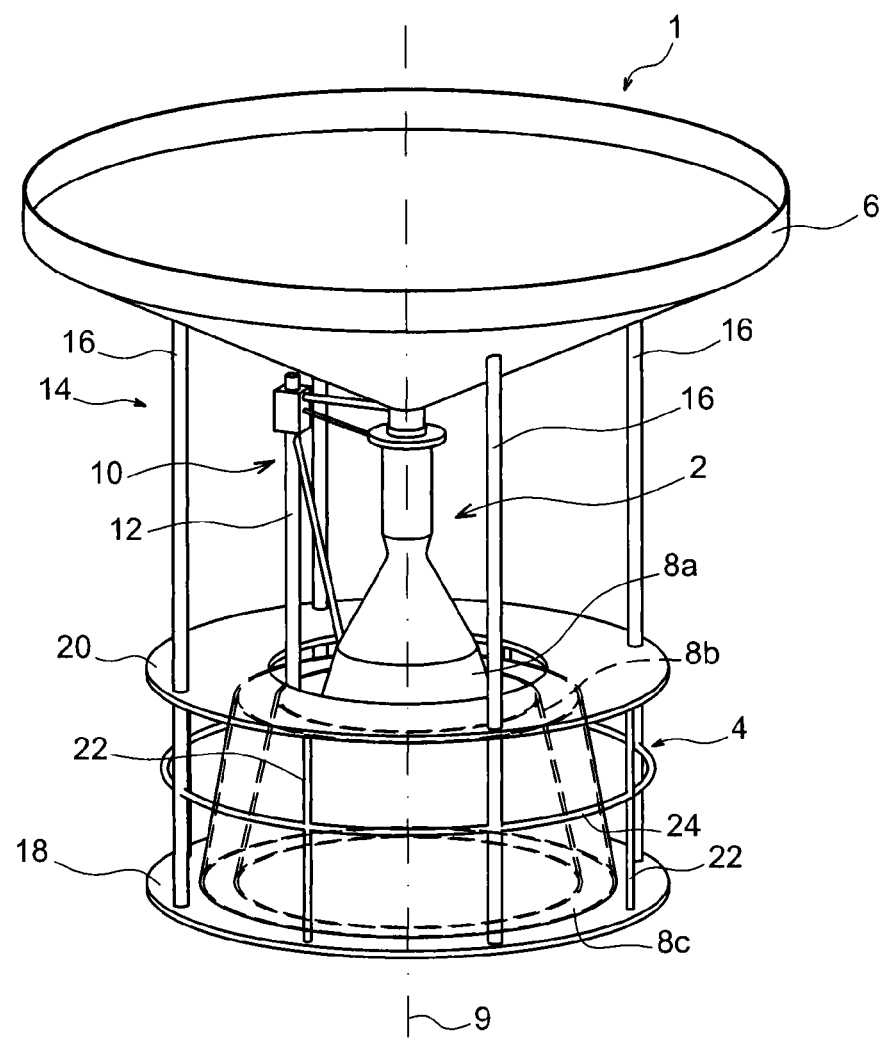
FIGS. 3 and 4 represent two perspective views, according to different angles, of the part of the launcher stage shown in the previous figures, with the nozzle thereof in the configuration for accessing the engine core thereof.
Figure 4:
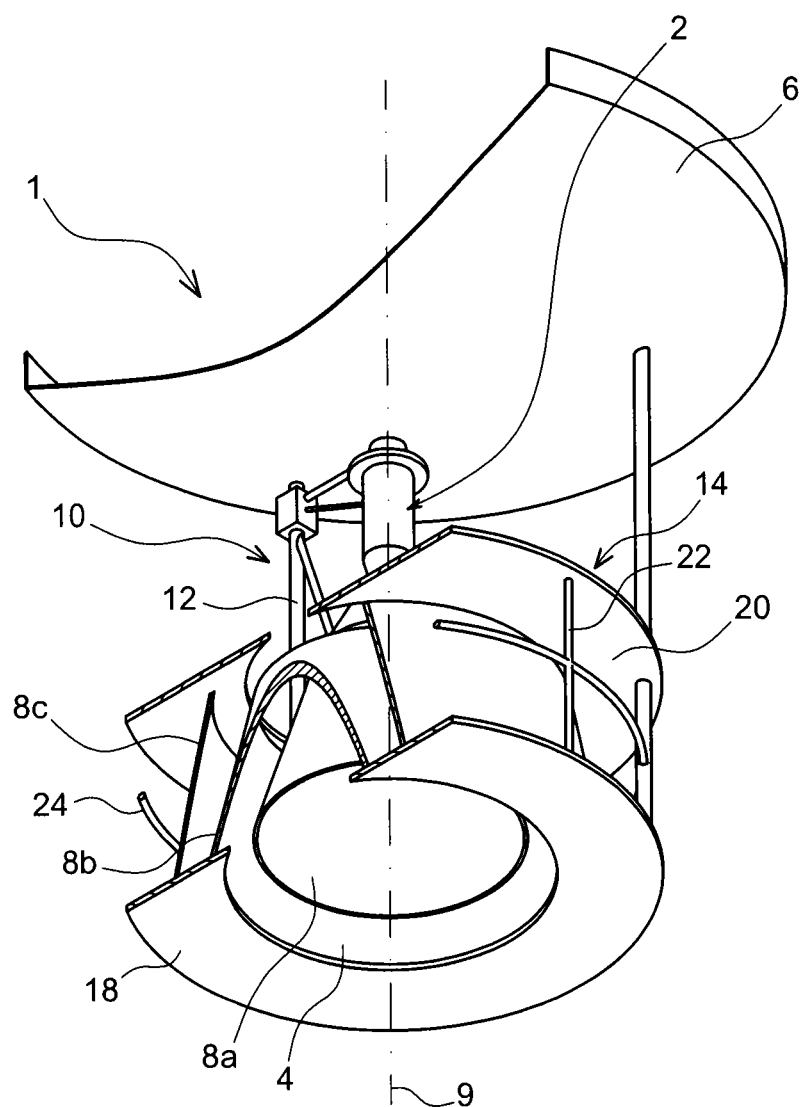

In FIGS. 3 and 4, one of the specific aspects of the invention is shown, consisting of providing a structure for temporarily supporting sections to be able to change the nozzle 4 to a third configuration, or configuration for accessing the engine core.

The temporary support structure 14 comprises a plurality of vertical rods 16, for example four, wherein the upper end is secured to the base of the tank 6. These rods, arranged about the engine core 2 and the nozzle sections 8a, 8b, 8c, also have a lower end fixedly bearing a ring-shaped lower support 18. This ring 18, having the axis 9, is envisaged to bear the third section 8c, supporting the lower end thereof. Contact is preferentially provided between the entire circumference of this lower end of the section 8c and the ring 18. In this way, the entire mass of this third section 8c is borne by the ring 18.

Furthermore, the same may apply for the second section 8b, as represented in FIGS. 3 and 4. In this case, even if this section continues to be mechanically connected to the rack 12, the mass thereof is borne entirely or almost entirely by the ring 18.

In this particular configuration, the sections enter into each other. More specifically, the first section 8a at least partially enters the second section 8b, whereas the latter at least partially enter the third section 8c. For an even more compact size, such as that shown, the three sections are inserted into each other while overlapping entirely, i.e. the upper ends thereof are situated substantially at the same first level, and the lower ends thereof are also situated substantially at the same second level. For this reason, in the specific configuration for the present invention, the reduced length of the nozzle is equivalent to a length of a single one of the three nozzles. As described above, the three sections 8a, 8b, 8c substantially have the same length along the axis 9, enabling a maximum compact size when inserted into each other, as shown in FIGS. 3 and 4.

The temporary support structure 14 also comprises an upper support 20 borne by the rods 16 traversing same, this support adopting an identical shape to that of the lower ring 18. This ring covers the upper ends of the second and third sections 8b, 8c, contact even being optionally provided to increase the mechanical support of these sections. A connecting frame between the two rings 18, 20 may also be provided, for example in the form of smaller vertical rods 22 connecting the two rings, and a ring 24 interconnecting said rods 22 along with the longer rods 16.

Although not shown, access steps and/or a tool storage compartment may be integrated in this structure 14, whereon operators can walk and/or secure themselves to perform operations on the engine core 2, the lateral access whereof has been entirely freed by lowering the sections 8b, 8c.

Indeed, in this configuration, the entire engine core 2 is accessible for operators seeking to perform nominal or non-nominal operations on the launch pad, since all the sections 8a, 8b, 8c are situated below this core 2.

This configuration may be adopted at the production output of the upper stage 1, and retained during the transport thereof on the launch pad. In this way, the sections 8a, 8b, 8c may be held mechanically in a very satisfactory manner by one or more elements of the temporary support structure, limiting the risk of damage thereof.

Figure 5:
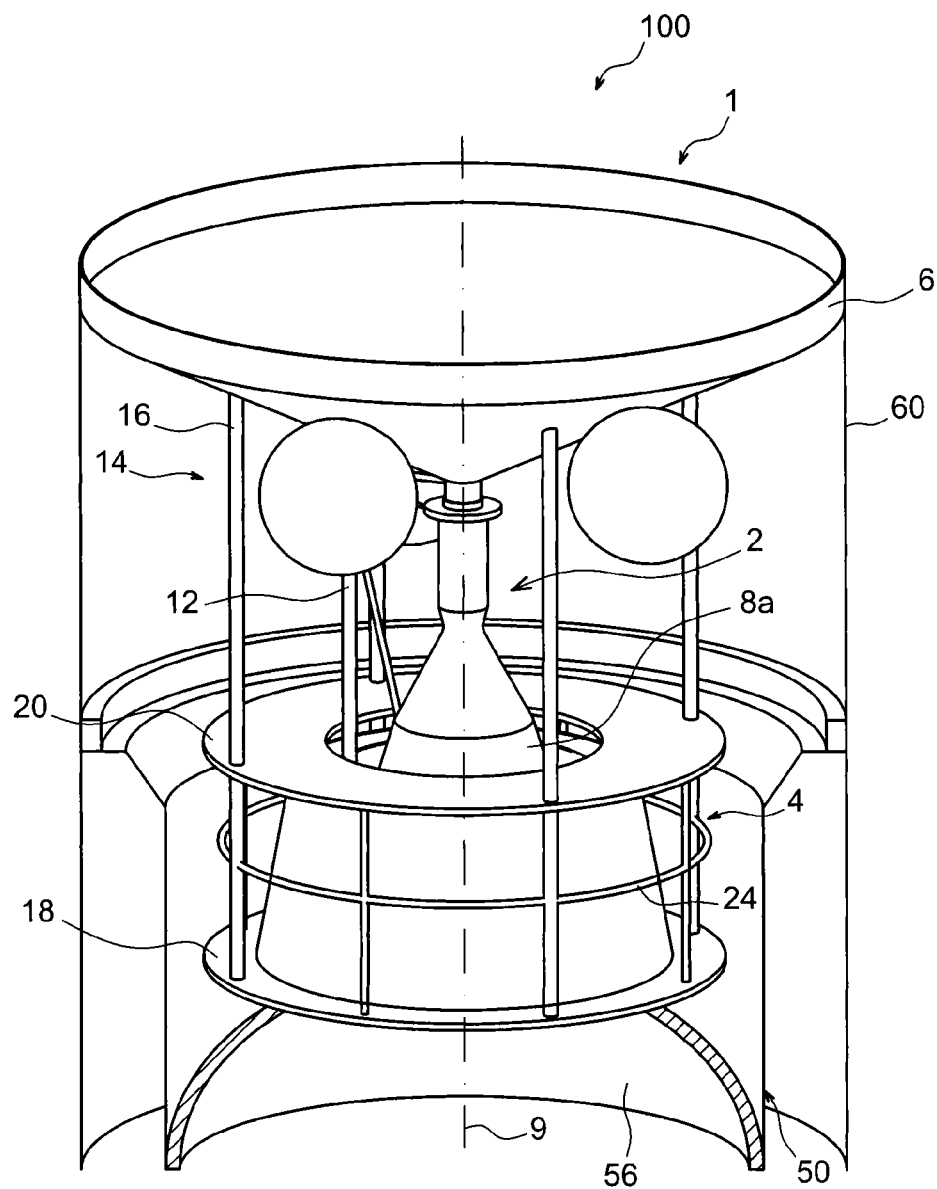
FIG. 5 represents a perspective view of a part of the launcher stage shown in the previous figures.

Then, also while retaining this configuration, the upper stage 1 is mounted on the launch pad above a main stage 50 of the launcher 100, shown partially in FIG. 5. The lower support 18 is then situated at an abutment or slightly above a tank 56 of this main stage 50, with the engine core 2 revealed by the sections.

Throughout the period prior to the launch, operations may thus be performed on the engine core 2, readily accessible to operators moving on the temporary structure 14. It is only before the gap between stages is sealed with a skirt 60, shown in FIG. 5, that the deployable nozzle 4 is moved to the launch configuration thereof represented in FIGS. 1 and 1a. For this purpose, the section 8b is preferably moved with the rack, until the locking thereof with the section 8c, and the temporary support structure 14 is then removed. The skirt 60 may then be installed.

It is noted that preferentially, the entire structure comprises a sufficient degree of demountability so that an operator can obtain access via the flap for accessing between the stages, which is small in size.

Obviously, various amendments may be made by those skilled in the art to the invention described herein, merely as non-limiting examples.

The invention claimed is:
1. A stage of a space launcher comprising:
   in an upright position, an engine core, a tank secured above the engine core, and a deployable nozzle comprising a first deployable nozzle section secured below the engine core;
   the deployable nozzle further comprising a second nozzle section borne by a structure enabling deployment of the deployable nozzle, along with a third nozzle section;
   the first, second, and third nozzle sections are configured to be situated extending from each other when the deployable nozzle is in a deployed propulsion configuration, with the second nozzle section being situated extending from the first nozzle section, and the third nozzle section being situated extending from the second nozzle section, the second nozzle section bearing the third nozzle section;

the stage further comprising a temporary support structure for temporarily supporting the nozzle sections mounted on the tank, the temporary support structure being suspended from the tank and being configured to change the deployable nozzle to a configuration for accessing the engine core wherein the first deployable nozzle section at least partially enters the second nozzle section, and wherein the second nozzle section at least partially enters the third nozzle section, wherein a lower end of the third nozzle section bears against a lower support of the temporary support structure; and the first, second, and third nozzle section are configured to be in a launch configuration in which an axial length of the deployable nozzle is reduced by raising the second nozzle section so that a lower end of the second nozzle section is axially situated approximately where an upper end of the first deployable nozzle section is secured to the engine core, the second nozzle section substantially blocking access to the engine core by encompassing the engine core in the launch configuration.

2. A stage according to claim 1, wherein, in the configuration for accessing the engine core, the lower end of the second nozzle section also bears against the lower support of the temporary support structure.

3. A stage according to claim 1, wherein, in the configuration for accessing the engine core, an upper end of each of the second and third nozzle sections is situated on a level with or below the upper end of the first deployable nozzle section connected to the engine core.

4. A stage according to claim 1, wherein the temporary support structure comprises rods connecting the lower support to the tank.

5. A stage according to claim 1, wherein the lower support is in a shape of a ring.

6. A stage according to claim 1, wherein the temporary support structure further comprises an upper support situated above an upper end of each of the second and third nozzle sections in the configuration for accessing the engine core.

7. A stage according to claim 6, wherein the temporary support structure further comprises a connection frame between the upper and lower supports, the connection frame being arranged around the third nozzle section.

8. A space launcher comprising at least one stage according to claim 1.

9. A method for manufacturing the space launcher including a main stage and an upper stage according to claim 1, the method comprising:

producing the upper stage, by changing the deployable nozzle to the configuration for accessing the engine core;

transporting the upper stage to a launch pad, with the deployable nozzle in the configuration for accessing the engine core; and on the launch pad, mounting the upper stage onto the main stage, with the deployable nozzle in the configuration for accessing the engine core.

10. A method for manufacturing the space launcher according to claim 9, further comprising, prior to a launch: placing the nozzle in a launch configuration, wherein the second nozzle section is arranged around the engine core, and the lower end of the second nozzle section bearing an upper end of the third nozzle section; and removing the temporary support structure.

* * * * *